United States Patent
Rehn

(10) Patent No.: US 8,398,249 B2
(45) Date of Patent: Mar. 19, 2013

(54) PROJECTOR FOR PROJECTING AN IMAGE AND CORRESPONDING METHOD

(75) Inventor: Henning Rehn, Berlin (DE)

(73) Assignee: Osram Gesellschaft mit beschraenkter Haftung, Munich (DE)

(*) Notice: Subject to any disclaimer, the term of this patent is extended or adjusted under 35 U.S.C. 154(b) by 246 days.

(21) Appl. No.: 12/735,545

(22) PCT Filed: Feb. 25, 2008

(86) PCT No.: PCT/EP2008/052253
§ 371 (c)(1),
(2), (4) Date: Jul. 26, 2010

(87) PCT Pub. No.: WO2009/106122
PCT Pub. Date: Sep. 3, 2009

(65) Prior Publication Data
US 2010/0302516 A1    Dec. 2, 2010

(51) Int. Cl.
*G03B 21/28* (2006.01)
*G03B 21/14* (2006.01)
*G02B 26/08* (2006.01)
*G02B 17/00* (2006.01)

(52) U.S. Cl. .......... 353/99; 353/97; 353/119; 353/37; 359/212.1; 359/223.1; 359/366

(58) Field of Classification Search .......... 353/99, 353/97, 119, 37; 359/201.02, 212.1, 223.1, 359/364, 365, 366
See application file for complete search history.

(56) References Cited

U.S. PATENT DOCUMENTS

| | | | |
|---|---|---|---|
| 4,239,394 A | 12/1980 | Aegidius et al. | |
| RE32,648 E * | 4/1988 | Montgomery | 353/66 |
| 7,264,360 B2 * | 9/2007 | Hatakeyama et al. | 353/99 |
| 2004/0223126 A1 | 11/2004 | Hatakeyama et al. | |
| 2005/0041220 A1 | 2/2005 | Sunaga | |
| 2005/0243300 A1 | 11/2005 | Pate et al. | |
| 2006/0007362 A1 | 1/2006 | Lee et al. | |

FOREIGN PATENT DOCUMENTS

| | | |
|---|---|---|
| DE | 28 22 579 A1 | 11/1979 |
| DE | 28 22 579 B2 | 11/1979 |
| DE | 28 22 579 C3 | 11/1979 |
| EP | 1450558 | 8/2004 |
| EP | 1 592 238 A1 | 11/2005 |

* cited by examiner

*Primary Examiner* — Georgia Y Epps
*Assistant Examiner* — Magda Cruz
(74) *Attorney, Agent, or Firm* — Holtz, Holtz, Goodman & Chick, P.C.

(57) ABSTRACT

A projector for projecting an image includes: a light source for generating a light bundle; a pivotable deflection unit for deflecting the light bundle generated by the light source onto a projection surface; and an imaging device for imaging an aperture of the deflection unit onto the projection surface. The imaging device includes a mirror objective having at least two mirror elements. A method for projecting an image is also provided.

24 Claims, 6 Drawing Sheets

PROJECTOR FOR PROJECTING AN IMAGE AND CORRESPONDING METHOD

This application is a U.S. National Phase Application under 35 USC 371 of International Application PCT/EP2008/052253, filed Feb. 25, 2008, which is incorporated herein in its entirety by this reference.

TECHNICAL FIELD

The invention relates to a projector for projecting an image, comprising a light source for generating a light bundle or light beam, comprising a deflection unit, which is designed for deflecting the light bundle generated by the light source onto a projection surface, and comprising an imaging device for imaging an aperture or a mirror surface of the deflection unit onto the projection surface. Moreover, the present invention relates to a method for projecting an image with the aid of a projector.

PRIOR ART

In the present case there is interest in a miniature version of a laser projector comprising a scanner mirror, (flying spot principle) by means of which images are intended to be represented on any desired projection surfaces with very high quality. Approaches for projectors of this type are already known from the prior art. They generally comprise a light source designed for generating a light beam or a light bundle, the light bundle being deflected onto a projection surface by means of a deflection unit that is pivotable, in particular oscillates in two axes. In this case, the light source is able to generate the colors red, green and blue.

The aperture of the deflection unit or the reflection surface of the scanner mirror and also the nominal pixel size of the projected image form an optical system having an etendue or a light conductance of $$E_c = \left(\frac{\pi \tan\theta_0 r}{2N}\right)^2,$$

where $\theta_0$ denotes the maximum deflection angle, that is to say double the angular amplitude of the mirror oscillation, r denotes the radius of the reflection surface of the deflection unit, and N denotes the number of pixels to be resolved in the oscillation plane under consideration on the projection surface. With N=480, which corresponds to a VGA resolution, a radius r=0.5 mm and with a maximum deflection angle $\theta_0=17°$, an etendue of $E_c=2.5 \cdot 10^{-7}$ mm$^2$sr is obtained, for example. Present-day semiconductor lasers have, in the case of a red color, for example, a beam waist having a radius of 3 μm, and accordingly an emission angle of at least 8°. Consequently, the etendue of the laser bundle is $E=(\pi \cdot 3 \cdot 10^{-3}$ mm·sin $8°)^2=2 \cdot 10^{-6}$ mm$^2$sr, that is to say is significantly greater than the above-described etendue of the projection system. Without additional technical measures, therefore, the brightness and/or quality of the projected image are/is fundamentally impaired. In the case of a projector of this type, moreover, the image on the projection surface is distorted and has a pincushion form similar to the illustration in FIG. 2.

If, by way of example, the laser bundle is focused onto the aperture of the deflection unit, then the greatest possible image brightness is obtained, but the spot on the projection surface is significantly larger than the nominal pixel size and, consequently, the resolution of the projected image is greatly impaired.

If, by contrast, the beam waist is placed onto the projection surface, then the extent of the laser bundle on the scanner mirror is larger than the area thereof, which results in light losses. Moreover, the energy which impinges on the comb structures of the mirror drive in the vicinity of the deflection unit or of the scanner mirror can detune the resonant frequency of the deflection unit and thus alter the amplitude and phase of the mirror oscillation, which can lead to an undesirable alteration of the projected image. As a compromise, the beam waist can be placed between the deflection unit and the projection surface, although it is then necessary to reckon with all the undesirable effects described.

It is not possible to enlarge the aperture or the mirror surface of the deflection unit or of the scanner mirror since otherwise the resonant frequency would become too low and aberrations as a result of the deformation of the mirror surface would greatly increase.

The above-described etendue problem and its effects can be avoided if an imaging device is provided which has the task of imaging the deflection unit or the scanner mirror onto the projection surface.

Thus, the document DE 43 24 849 C2 discloses a projector for projecting an image, in which a light bundle is generated by means of a light source and then guided over a projection surface by means of a deflection unit. In that case, an imaging device is arranged between the deflection unit and the projection surface, said imaging device being embodied in at least two stages and in a focal fashion. In addition, the known imaging device is corrected in a manner free of distortion and has a magnification of >1. One disadvantage of the known imaging device is that an objective having a large number of individual lenses has to be used in order to obtain the desired freedom from distortion and to avoid chromatic aberrations and a resultant impairment of the image quality in the process. Consequently, such a projection objective is of little suitability for miniature projectors.

SUMMARY OF THE INVENTION

The object of the present invention consists in realizing a projector and also a method for projecting an image, wherein the imaging device is intended to supply an image that has little distortion and is free of chromatic aberrations, and can be realized cost-effectively and compactly.

This object is achieved according to the invention by means of a projector comprising the features according to patent claim 1 and also by means of a method comprising the features in accordance with patent claim 23.

Advantageous configurations and embodiments of the invention are specified in the dependent claims.

A projector according to the invention for projecting an image comprises a light source for generating a light bundle, and a deflection unit, which is designed for deflecting the light bundle generated by the light source onto a projection surface. The projector furthermore has an imaging device for imaging an aperture of the deflection unit onto the projection surface. An essential concept of the invention consists in the fact that the imaging device comprises a mirror objective having at least two mirror elements.

In other words a basic concept of the invention consists in configuring the imaging device in favor of increasing the image quality in such a way that it comprises a mirror objective wherein at least two mirror elements are used for imaging the aperture or a reflection surface of the deflection unit onto the projection surface.

What is advantageously achieved by the projector according to the invention is that an image which is free of distortion or has little distortion in comparison with projection without an imaging device can be generated on the projection surface.

In particular, the projector is intended to be designed such that a beam waist of the light bundle coming from the light source is placed onto the aperture of the deflection unit, the diameter of the beam waist being chosen to be somewhat smaller than the diameter of the aperture, as a result of which excessive illumination of the deflection unit is prevented an no light losses are caused. The imaging scale of the mirror objective is chosen, in particular, such that the image of the aperture of the deflection unit on the projection surface approximately corresponds to the desired pixel size and is preferably somewhat smaller than the latter. Consequently, a beam waist will also lie on the projection surface or in the vicinity thereof. It has been found that the depth of field of the image is not significantly reduced by such imaging, and so it is not necessary to effect refocusing in the case of a realistic projection distance with the mirror objective.

In the case of miniature laser projectors, a realistic projection distance will be approximately 500 mm (300 to 1000 mm). According to the prior art and on account of requirements with regard to eye safety, the luminous flux of such a projector will be 5 to 20 lm, which results, for the person skilled in the art, in an expedient image size of approximately A5 to A4 and at a scanned angle of 15° for such a projection distance.

The mirror objective preferably has a magnification of greater than or equal to one, such that the scanned angular range downstream of the mirror objective is at least as large as the angular range coming from the deflection unit. In the case of angular magnification it is possible to use a deflection unit with a low maximum deflection angle, as a result of which the deflection unit can be realized cost-effectively and with more latitude for frequency and aperture size. In this case, the angular magnification by the mirror objective can be identical or different in magnitude for the two directions of the mirror oscillation. Thus, it may be provided, for example, that the aperture angle of the scanned angular range downstream of the deflection unit is 5° in the horizontal and vertical directions, and the mirror objective is preferably embodied in such a way that the aperture angle is 12° in the horizontal direction and 10° in the vertical direction.

In one embodiment, the deflection unit comprises at least one scanner mirror or micromirror or microscanner which is embodied in movable fashion, in particular in a manner pivotable about two axes. By using a simple scanner mirror, a cost-reduced and component-reduced projector is provided. In a further embodiment, the deflection unit can comprise two separate micromirrors which oscillate in a respective direction. In this case, the mirror objective will be designed, in particular, such that the beam waist on the primary micromirror in the light direction is imaged onto the projection surface.

It has been found that, by means of imaging using at least two, and in particular only two mirror elements, an f-theta correction can be effected, as a result of which a virtually distortion-free image can be generated on the projection surface. In other words, what is achieved by this means is that the screen coordinate of the projected spot represents a linear function of the deflection angle of the deflection unit.

Preferably, the light source comprises at least one diode-pumped solid-state laser (RGB laser source), the projector being embodied as a laser projector, in particular. In this case, the light source can be directly modulated or comprise a modulation unit designed for modulating the light bundle. Preferably, the light source is designed for modulating the light bundle in a manner dependent on a movement of the deflection unit. In particular, by means of the light source, three colors, red, green and blue, are generated, modulated and combined to form a light bundle, in particular a laser bundle, which already contains all the image information.

Preferably, reflection surfaces of the at least two mirror elements are in each case embodied as a solid of revolution produced by a rotation of a conic about a rotation axis. In particular, the conics can be hyperbolas. One preferred embodiment provides for the solids of revolution to have a common rotation axis.

Preferably, the normal to the aperture or mirror surface of the deflection unit, in the rest state is intended to be arranged at an angle of between 20° to 60°, in particular at an angle of 40°, with respect to the common rotation axis of the solids of revolution.

It has proved to be advantageous that the quotient of the numerical eccentricity of a second conic to the numerical eccentricity of a first conic lies in a value range of 0.6 to 0.8, and is 0.7, in particular. It is advantageous, in particular, if the numerical eccentricity of the first conic lies in a value range of 5 to 7, and is 6, in particular.

Preferably, the deflection unit is arranged at a focal point of the first of the hyperbolic mirror elements of the mirror objective or in the direct vicinity thereof. In particular, the deflection unit is intended to be arranged at a distance of less than 2 mm, in particular less than 1 mm, from the first focal point of the first mirror element. Preferably, the mirror objective is embodied in such a way that a second focal point of the first mirror element coincides with a first focal point of the second mirror element. In this case, too, it may preferably be provided that the first focal point of the second mirror element is arranged at a distance of less than 2 mm, in particular at a distance of less than 1 mm, from the second focal point of the first mirror element. These defocusings allow a compromise between the effects of the spherical aberration and the koma. In particular, the distance between the mirror elements is intended to increase as a result of the defocusing.

In one preferred embodiment it is provided that, in the direction of light propagation, one of the mirror elements has a convex form and the other a concave form. In particular, a reflection surface of the first mirror element that faces the second mirror element is intended to be embodied in concave fashion, and a reflection surface of the second mirror element that faces the first mirror element is intended to be embodied in convex fashion. In this way, a first reflection takes place at the concave reflection surface and a second reflection takes place at the convex reflection surface.

In order to provide a compact projector, in one embodiment it is provided that the distance between the first and second focal points of the first mirror element is less than 20 mm, and that the quotient of the distance between the focal points of the first mirror element to the distance between the focal points of the second mirror element preferably lies in a value range of 1.2 to 1.8, and is 1.5, in particular.

In particular, the projector is designed in such a way that the light bundle pointing toward a lower edge of the image after passing through the mirror objective is directed higher by an angle of 0° to 20°, in particular by an angle of 5° to 10°, in vertical direction than the light bundle before passing through the mirror objective.

The projector can preferably be embodied as a separate device or be integrated into a parent device such as, for example, a mobile telephone, a digital camera or a video camera.

In one embodiment, the projector preferably has a pivoting or folding apparatus arranged on a housing of the projector or of a parent device, by means of which pivoting or folding apparatus the second mirror element is held and can be pivoted between a starting position, in which the rear side of said mirror element terminates with the housing, and a reflection position, in which emission of the light bundle from the housing is possible. In particular, it is provided that the second mirror element at least partly protrudes from the housing in the reflection position. In particular, in the housing, a passage opening for the light bundle is formed in the reflection position of the second mirror element, such that emission of the light bundle from the housing is made possible. In the initial position of the second of the mirror elements, said passage opening can preferably be closable by the pivotable second mirror element. In particular, the pivoting of the second mirror element into the reflection position causes the projector to be switched on.

In an alternative embodiment, it may be provided that the at least two mirror elements are arranged at least partly in a housing of the projector or of a parent device. In particular, the housing can have a screen element, through which the light bundle emerges from the housing. In particular, this embodiment provides for the at least two mirror elements to be arranged completely in the housing.

As an alternative, it may be provided that one of the mirror elements is arranged conformally on an outer surface of a housing of the projector or of a parent device. By way of example, the housing can have a base body and also a substantially spherical part arranged on the base body, the second mirror element preferably being arranged on the substantially spherical part of the housing, such that a form of a convex reflection surface of the second mirror element virtually corresponds to the form of an outer surface of the substantially spherical part of the housing. In particular, in this embodiment, the housing can have a passage opening, which can preferably be formed on a side of the base body which faces the second mirror element.

A method according to the invention is designed for projecting an image with the aid of a projector. In the method, a light bundle is generated by means of a light source and is deflected onto a projection surface by means of a deflection unit, and an aperture of the deflection unit is imaged onto the projection surface by means of an imaging device. A basic concept in the method consists in the fact that the aperture of the deflection unit is imaged onto the projection surface by means of a mirror objective of the imaging device having at least two mirror elements.

Advantageous configurations of the projector according to the invention should be regarded as advantageous embodiments of the method according to the invention.

BRIEF DESCRIPTION OF THE DRAWINGS

Further advantages, features and details of the invention will become apparent from the following description of individual preferred exemplary embodiments and with reference to the accompanying drawings, in which.

PREFERRED EMBODIMENT OF THE INVENTION

Figure 1:
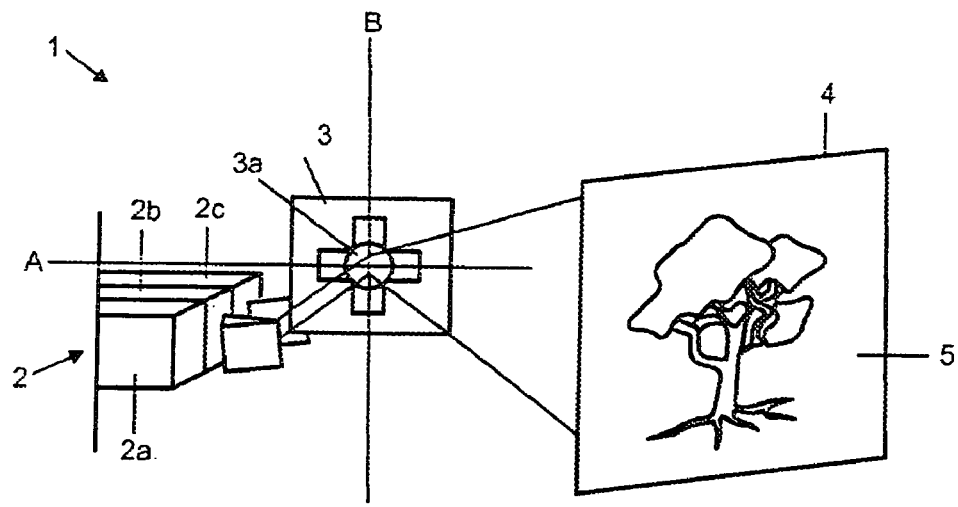
FIG. 1 shows, in a schematic illustration, a laser projector with a scanner mirror as deflection unit in accordance with the prior art.

The exemplary embodiments outlined in greater detail below represent preferred embodiments of the present invention, yet the invention is not restricted to the exemplary embodiments illustrated in the drawings. All features described below and illustrated in the drawings can be combined with one another in diverse ways.

In the figures, identical or functionally identical elements are provided with identical reference symbols.

A projector 1, in the present case a laser projector, in accordance with the prior art as illustrated in FIG. 1 comprises a light source 2 which in the present case comprises a plurality of diode-pumped solid-state lasers (RGB laser source). The light source 2 has the task of generating a respective light bundle for three colors, red, green and blue, modulating these light bundles and combining them to form a light bundle, in the present case a laser bundle, which contains all the image information. For this purpose, the light source 2 comprises three laser units 2a, 2b, 2c, which are designed for generating a respective color. The laser projector furthermore has a deflection unit 3, which comprises a scanner mirror in the present example. The scanner mirror 3 has an aperture or a reflection surface 3a and, in the present case, can be pivoted about two axes, a horizontal pivoting axis A and a vertical pivoting axis B. Moreover, the laser projector 1 in accordance with the prior art comprises a screen 4, which has a projection surface 5, on which the image is generated by means of the light bundle. The image is generated on the projection surface 5 by means of the light bundle, which already contains all the image information, being guided over the projection surface 5 by means of the scanner mirror 3.

One disadvantage of this known projection method consists in the small etendue, thus resulting in limitations with regard to image brightness or image quality.

Figure 2:
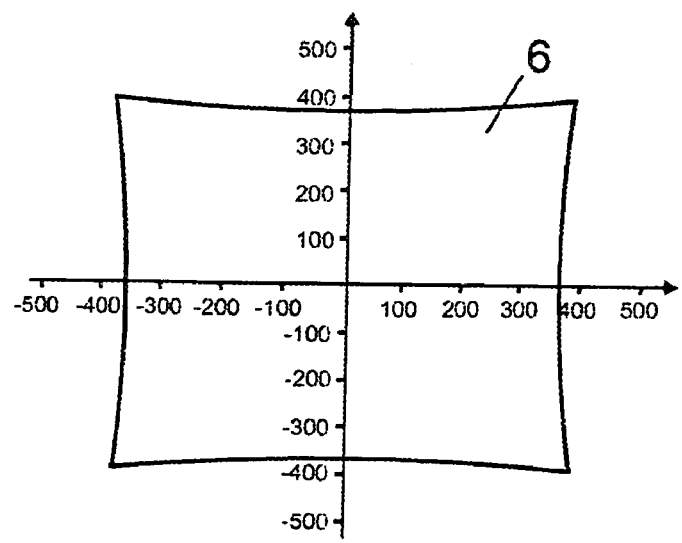
FIG. 2 shows a distorted image generated by a conventional laser projector with a scanner mirror oscillating in two axes.

Moreover, a fundamentally distorted image arises on the projection surface 5, said image being illustrated in FIG. 2, where a pincushion distortion of the image 6 can clearly be discerned.

Figure 3:
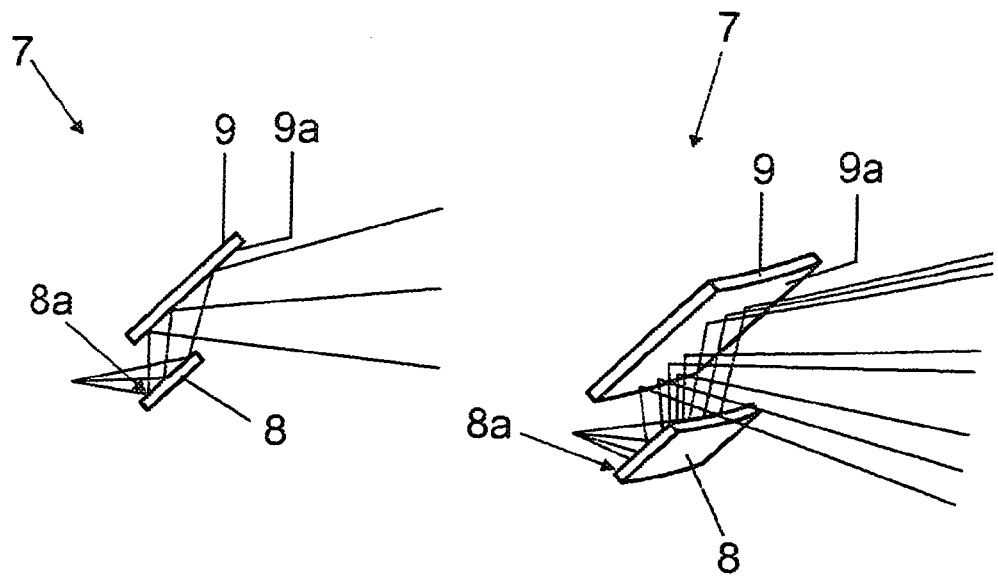
FIG. 3 shows a mirror objective for a laser projector in accordance with one embodiment of the invention.

In order to ensure that a distortion-free image is generated on the projection surface 5, according to the invention the aperture or the reflection surface 3a of the deflection unit 3 is imaged onto the projection surface 5 by means of an imaging device, comprising a mirror objective having at least two mirror elements. FIG. 3 shows an example of a mirror objective 7, comprising a first and a second mirror element 8, 9, which is designed for imaging the aperture 3a onto the projection surface 5 of the screen 4. In this case, the spot of the laser bundle on the projection surface 5 of the screen 4 remains smaller than the nominal pixel size, as a result of which an impairment of the resolution is prevented.

In the present example, the first mirror element 8 has a concave reflection surface 8a, the second mirror element 9 having a convex reflection surface 9a facing the concave reflection surface 8a of the first mirror element 8.

Referring one again to FIG. 3 it should be mentioned that the reflection surfaces 8a, 9a of the two mirror elements 8, 9 are in each case embodied as a solid of revolution produced by a rotation of a conic about a rotation axis. In the present example, the two conics are hyperbolas; in the preferred exemplary embodiment, the two solids of revolution 8a, 9a have a common rotation axis (not illustrated). In the present example, the quotient of the numerical eccentricity of the second conic 9 to that of the first conic 8 is $e=0.7$, the numerical eccentricity of the first conic being $e=6.45$.

Figure 4:
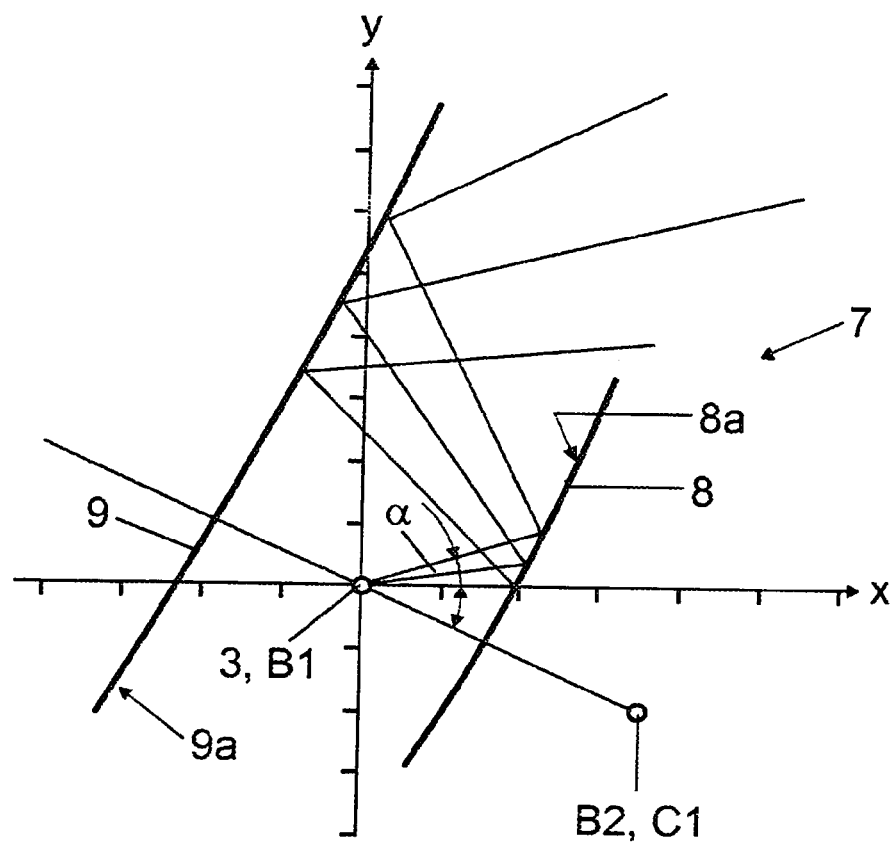
FIG. 4 shows a sectional illustration of a mirror objective with two mirror elements in accordance with one embodiment of the invention.

A geometrical sectional illustration of the mirror objective 7 in a two-dimensional coordinate system is represented in FIG. 4. In the example, the scanner mirror 3 is arranged at the coordinate origin (0,0), its maximum angular deflection is 5° and the angle of incidence with respect to the X-axis is 10°, thus resulting in a reflected angle range α of between 0° and 20°. A light bundle reflected by the scanner mirror 3 is subsequently reflected by the concave reflection surface 8a of the first mirror element 8 and then by the convex reflection surface 9a of the second mirror element 9 in the direction of the projection surface 5 (not illustrated in FIG. 4). In the example, the scanner mirror 3 is arranged at a fist focal point B1 of the first mirror element 8, a second focal point B2 of the first mirror element 8 coinciding with a first focal point C1 of the second mirror element 9. In this case, the quotient of the distance between the focal points B1, B2 of the first mirror element 8 to the distance between the first focal point C1 and a second focal point (not illustrated) of the second mirror element 9 is 1.4. The distance between the first and second focal points B1, B2 of the first mirror element 8 is 19.3 mm. A compact mirror objective 7 is thereby provided.

Figure 5:
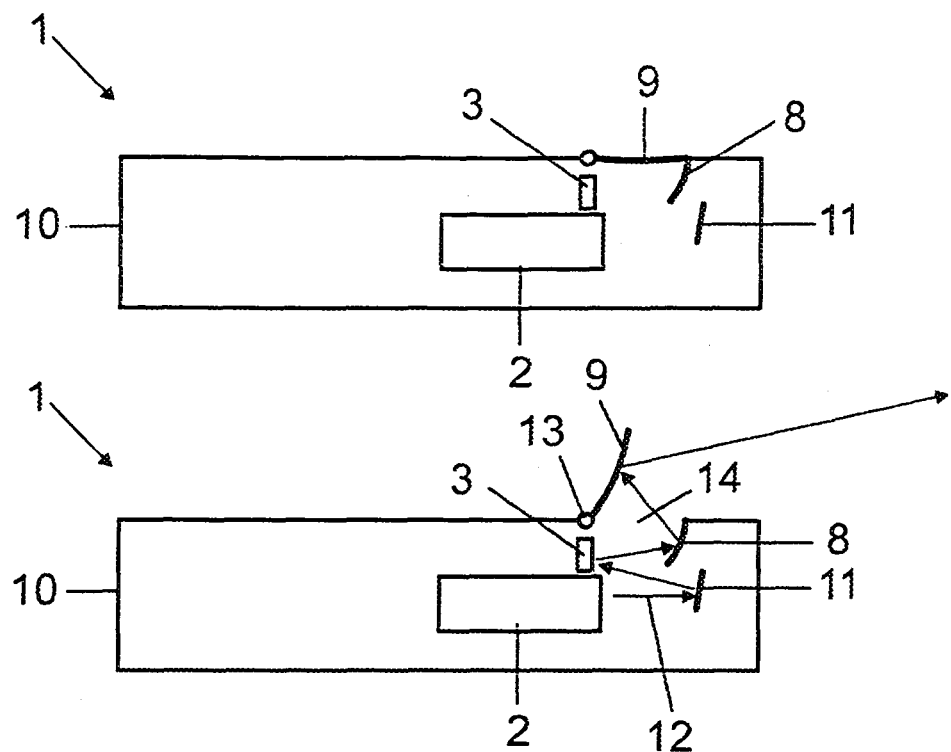
FIG. 5 shows, in a schematic illustration, the embedding of a laser projector into a housing in accordance with one exemplary embodiment.

A laser projector 1 in accordance with one exemplary embodiment of the invention is illustrated with regard to a mechanical embodiment in FIG. 5. The laser projector 1 can be embodied as a separate device or be embedded into a parent device (mobile telephone, digital camera, video camera). Arranged in a housing 10 of the laser projector 1 or of the parent device there are a light source 2, which comprises a plurality of diode-pumped solid-state lasers in the present example, and a deflecting mirror 11, which has the task of reflecting a light bundle 12 generated by the light source 2 onto a deflection unit 3. In the example, the deflection unit 3 comprises a scanner mirror. The laser projector 1 has a first and a second mirror element 8, 9, which are designed for imaging the scanner mirror 3 onto the projection surface in the manner explained in greater detail above. In the present example, the housing 10 of the laser projector 1 comprises a pivoting apparatus 13, by means of which the second mirror element 9 is held and can be pivoted between a starting position shown in the top illustration in FIG. 5 and a reflection position in the bottom illustration in FIG. 5. It should be mentioned at this juncture that the light source is intended to be switched off in the starting position of the second mirror element 9, whereas emission of the light bundle 12 from the housing 10 is made possible in the reflection position. Thus, in the housing 10, a passage opening 14 is formed in the reflection position of the second mirror element 9, through which passage opening the light bundle 12 is to be emitted during operation. In the starting position, the passage opening 14 is closed by means of the second mirror element 9.

Figure 6:
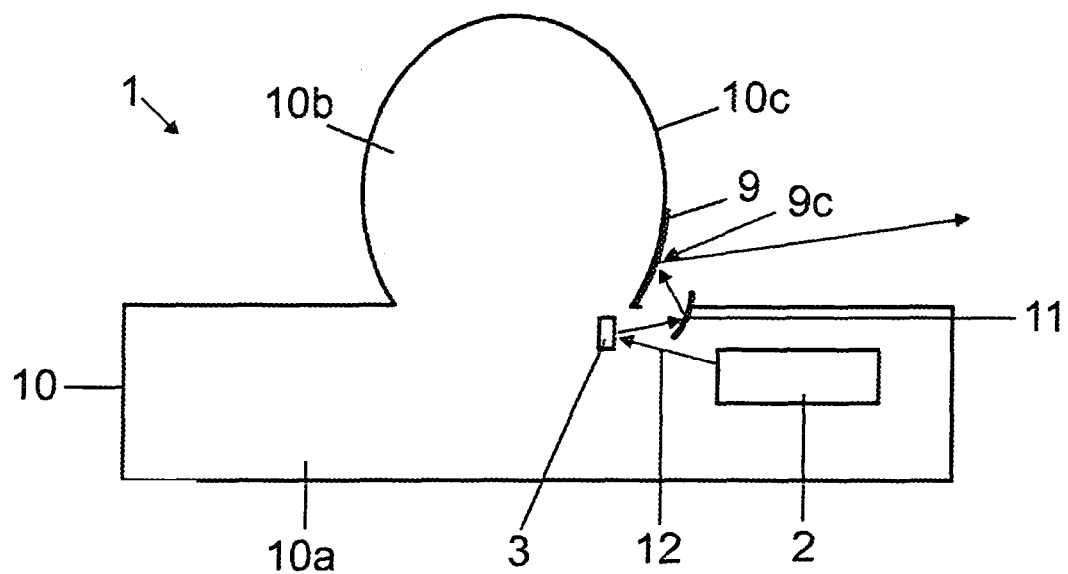
FIG. 6 shows, in a schematic illustration, the embedding of a laser projector into a housing in accordance with a further exemplary embodiment.

A laser projector 1 in accordance with a further exemplary embodiment is illustrated with regard to a mechanical embodiment in FIG. 6. The laser projector 1 illustrated in FIG. 6 comprises substantially the same elements as the laser projector 1 illustrated in FIG. 5, and so only the differences between the examples will be discussed. In the present example, the housing 10 has a base body 10a, in which the light source 2 and the scanner mirror 3 are arranged. The housing 10 furthermore comprises a substantially spherical part 10b arranged on the base body 10. The second mirror element 9 is arranged on an outer surface 10c of the substantially spherical part 10b, such that the convex reflection surface 9a of the second element 9 is embedded into the surface 10c of the part 10b.

Figure 7:
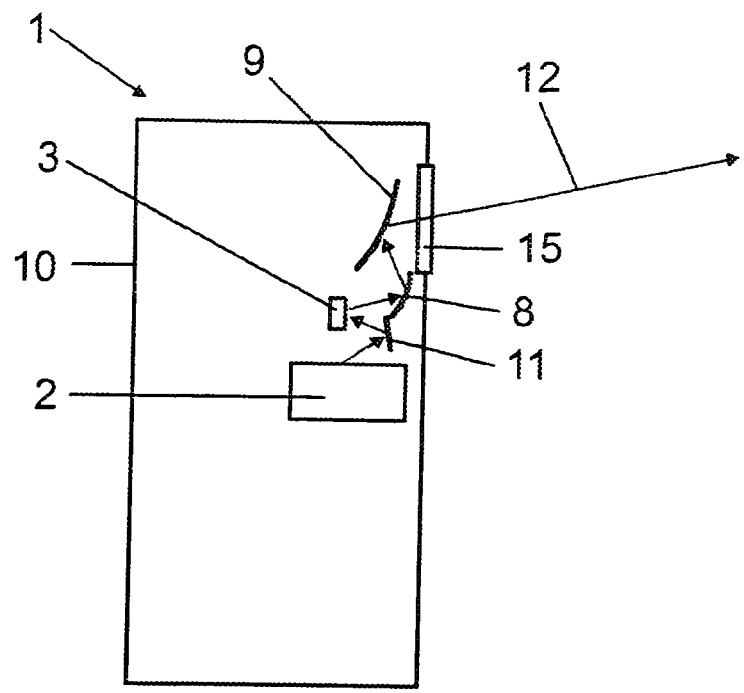
FIG. 7 shows, in a schematic illustration, a laser projector in accordance with a further exemplary embodiment.

A laser projector 1 in accordance with a further exemplary embodiment of the invention is illustrated with regard to a mechanical embodiment in FIG. 7. In this example, both the first and the second mirror elements 8, 9 are arranged completely in the housing 10 of the laser projector 1. The housing 10 comprises an exit window or screen element 15, through which the light bundle 12 is emitted from the housing 10.

Figure 8:
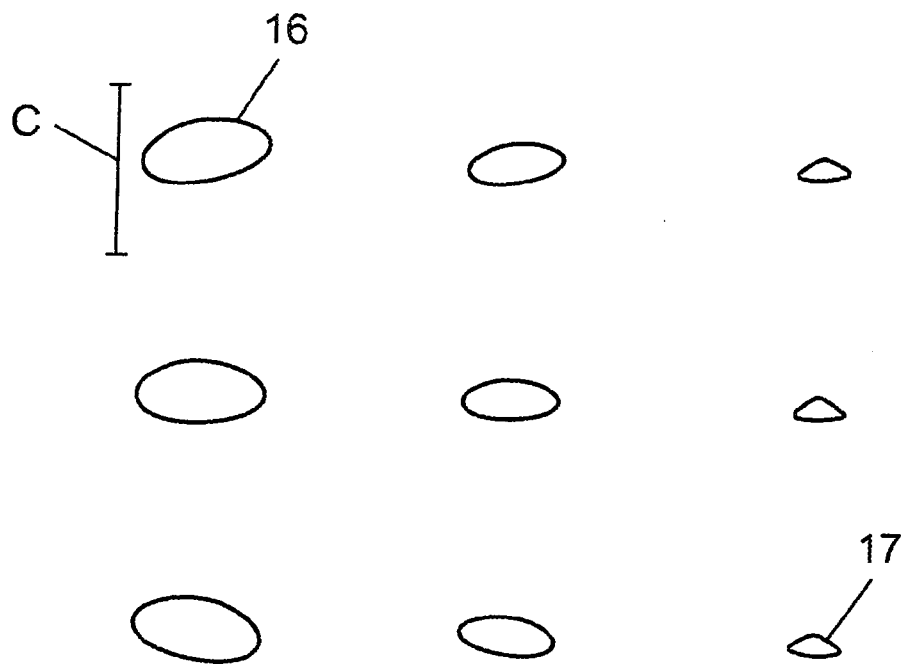
FIG. 8 shows aberration-governed spot sizes in comparison with an XGA pixel size for the mirror objective according to one preferred embodiment of the invention.

FIGS. 8 to 11 illustrate the image quality achieved by means of the mirror objective 7, comprising two mirror elements 8, 9. FIG. 8 shows aberration-governed geometrical spot images over an entire field given by an angular range—coming from the scanner mirror 3—of ±12° horizontally and 0° to 20° vertically in comparison with the pixel size for XGA resolution, which is indicated on the basis of a bar C in FIG. 8. The XGA pixel size is 280 μm in the present case. A first spot 16 is in this case assigned to a deflection angle of the light bundle deflected by the deflection unit 3 in a horizontal direction of −12° and in a vertical direction of 0°, which corresponds to an image coordinate point (−106.869 mm; 13.550 mm) on the projection surface. A spot 17 is assigned to a deflection angle in the horizontal direction of 20° and in the vertical direction of 12°, which corresponds to an image coordinate point on the projection surface (103.950 mm, 195.909 mm). As is illustrated in FIG. 8, all the spot sizes are smaller than the XGA pixel size, and so what is achieved is that no impairment of the resolution can adversely affect the quality of the image.

Figure 9:
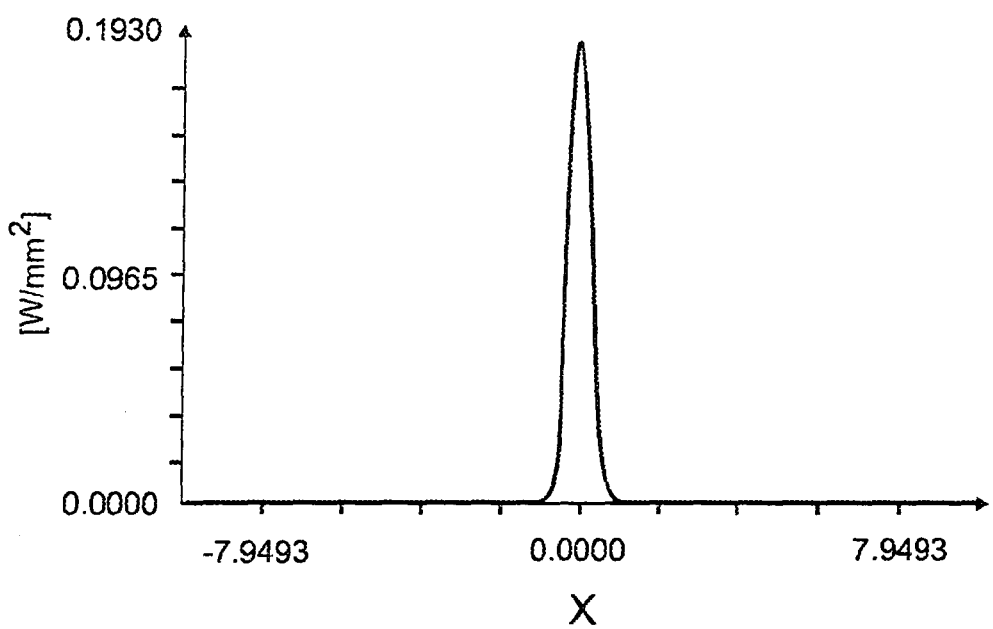
FIG. 9 shows a cross section through a beam waist on a projection surface.

FIG. 9 illustrates a cross section through a beam waist on the projection surface for a wavelength of the laser bundle of 550 nm and a deflection angle in the horizontal direction of 0° and in the vertical direction of −12°. Here the beam waist is 160 μm and is therefore smaller than the XGA pixel size.

Figure 10:
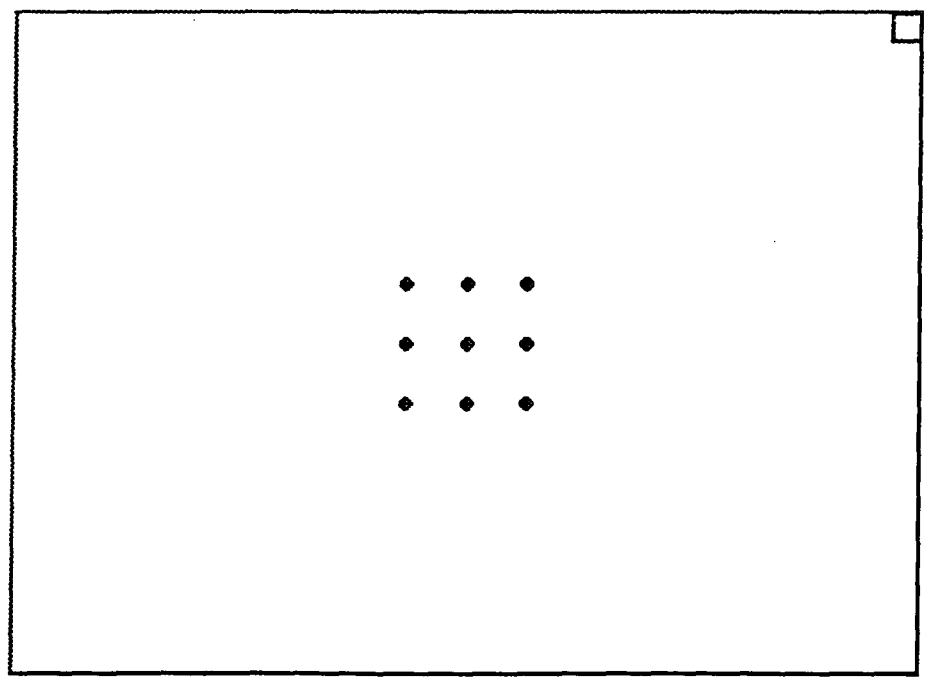
FIG. 10 shows the image field showing low-distortion imaging generated by means of the mirror objective according to one embodiment of the invention.

FIG. 10 shows corner points of a virtually rectangular image generated by the laser projector 1 with the mirror objective 7.

It is known from the prior art that the laser projector does not require focusing in order to ensure a large depth of field of the image. With the use of the mirror objective in the preferred embodiment, the depth of field remains in a sufficiently large range to obtain the preferred projection distance of 500 mm.

Figure 11:
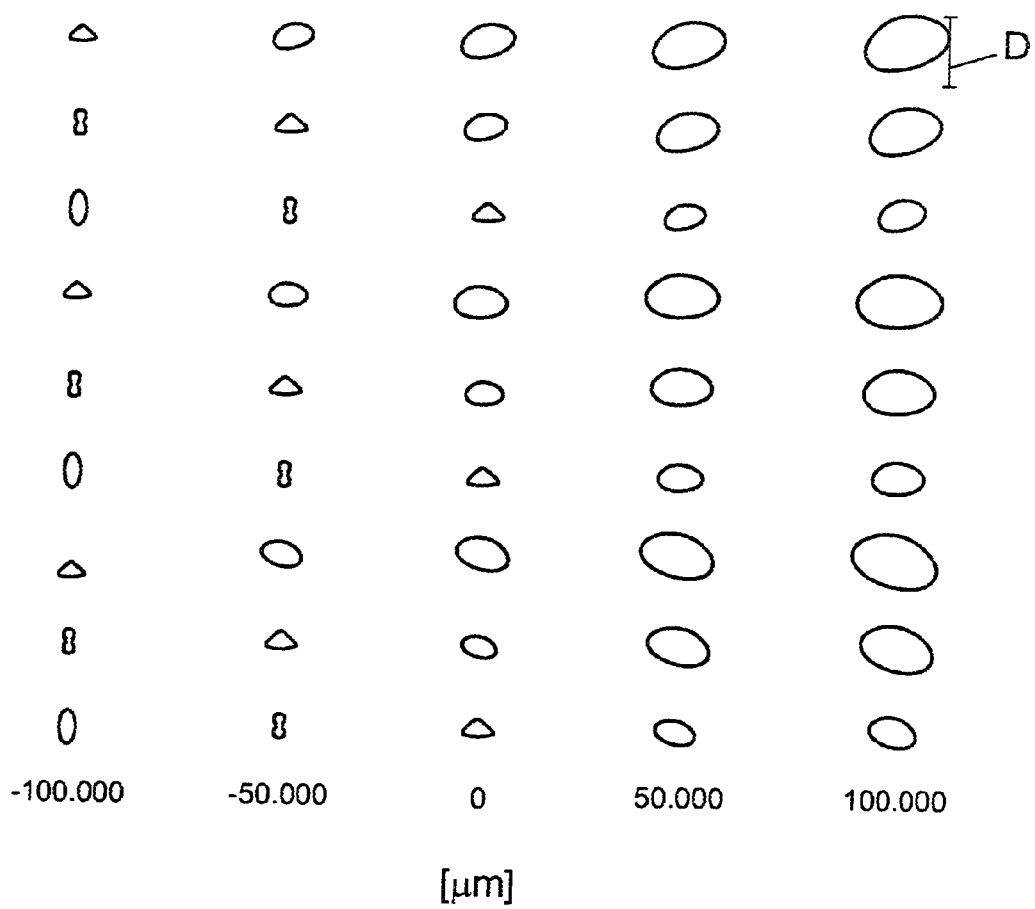
FIG. 11 shows aberration-governed spot sizes for the mirror objective according to the preferred embodiment of the invention as a function of a projection distance in comparison with an XGA pixel size for illustrating the depth of field.

FIG. 11 represents the spot images as a function of the defocusing for all deflection angles in comparison with an XGA pixel size. In FIG. 11, each column is assigned a different defocusing (in μm), each row being assigned a different deflection angle (in the horizontal and vertical directions). The pixel size of 280 μm is indicated on the basis of a bar D for a projection distance of 500 mm in FIG. 11.

Since it increases proportionally to the projection distance, all of the spot images remain smaller than the pixel size at least for projection distances of 300 mm to 600 mm.

The invention claimed is:

1. A projector for projecting an image, the projector comprising:
   a light source for generating a light bundle;
   a pivotable deflection unit for deflecting the light bundle generated by the light source onto a projection surface; and
   an imaging device for imaging an aperture of the deflection unit onto the projection surface;
   wherein the imaging device comprises a mirror objective having at least two mirror elements; and
   wherein the mirror objective has an angular magnification of greater than 1.

2. The projector as claimed in claim 1, wherein the deflection unit comprises at least one movable scanner mirror.

3. The projector as claimed in claim 1, wherein the light source comprises at least one diode-pumped solid-state laser.

4. The projector as claimed in claim 1, wherein the light source modulates the light bundle based on a movement of the deflection unit.

5. The projector as claimed in claim 1, wherein the angular magnification of the mirror objective is between 1.0 and 1.2.

6. The projector as claimed in claim 1, wherein the mirror objective is arranged such that the light bundle pointing toward a lower edge of the image after passing through the mirror objective is directed higher by an angle of 0° to 20° in a vertical direction than the light bundle before passing through the mirror objective.

7. The projector as claimed in claim 6, wherein the image after passing through the mirror objective is directed higher by an angle of 5° to 10°.

8. The projector as claimed in claim 1, wherein the deflection unit is arranged at a first focal point of a first mirror element of the mirror objective.

9. The projector as claimed in claim 1, wherein the mirror objective is arranged such that a second focal point of a first mirror element coincides with a first focal point of a second mirror element.

10. The projector as claimed in claim 1, wherein a reflection surface of a first mirror element that faces a second mirror element is concave.

11. The projector as claimed in claim 1, wherein a reflection surface of a second mirror element that faces a first mirror element is convex.

12. The projector as claimed in claim 1, wherein the projector further comprises a pivoting apparatus arranged on a housing of the projector, the pivoting apparatus holding the second mirror element such that the second mirror element is pivotable between a starting position and a reflection position in which emission of the light bundle from the housing is made possible.

13. The projector as claimed in claim 12, wherein the projector can be switched on by the second mirror element being pivoted into the reflection position.

14. The projector as claimed in claim 1, wherein the at least two mirror elements are arranged in a housing of the projector and the housing has a screen element through which the light bundle is emitted from the housing.

15. The projector as claimed in claim 1, wherein one of the mirror elements is arranged on an outer surface of a housing of the projector.

16. A method for projecting an image by a projector comprising a light source, a pivotable deflection unit, and an imaging device, the method comprising:
   generating a light beam by the light source;
   deflecting the light beam onto a projection surface by the pivotable deflection unit; and
   imaging an aperture of the deflection unit onto the projection surface by the imaging device;
   wherein the aperture of the deflection unit is imaged onto the projection surface by a mirror objective of the imaging device having at least two mirror elements; and
   wherein the mirror objective has an angular magnification of greater than 1.

17. A projector for projecting an image, the projector comprising:
   a light source for generating a light bundle;
   a pivotable deflection unit for deflecting the light bundle generated by the light source onto a projection surface; and
   an imaging device for imaging an aperture of the deflection unit onto the projection surface;
   wherein the imaging device comprises a mirror objective having at least two mirror elements; and
   wherein reflection surfaces of the at least two mirror elements are in each case embodied as a solid of revolution produced by a rotation of a conic about a rotation axis.

18. The projector as claimed in claim 17, wherein the at least two solids of revolution have a common rotation axis.

19. The projector as claimed in claim 18, wherein the normal to the aperture of the deflection unit, in the rest state, is arranged at an angle of 20° to 60° with respect to the common rotation axis of the solids of revolution forming the reflection surfaces of the mirror elements.

20. The projector as claimed in claim 17, wherein the at least two conics are hyperbolas.

21. The projector as claimed in claim 17, wherein a quotient of a numerical eccentricity of a second conic to a numerical eccentricity of a first conic lies in a value range of 0.6 to 0.8.

22. The projector as claimed in claim 17, wherein a numerical eccentricity of a first conic lies in a value range of 5 to 7.

23. A projector for projecting an image, the projector comprising:
   a light source for generating a light bundle;
   a pivotable deflection unit for deflecting the light bundle generated by the light source onto a projection surface; and
   an imaging device for imaging an aperture of the deflection unit onto the projection surface;
   wherein the imaging device comprises a mirror objective having at least two mirror elements; and
   wherein a quotient of a distance between focal points of the first mirror element to a distance between focal points of the second mirror element lies in a value range of 1.2 to 1.8.

24. A projector for projecting an image, the projector comprising:
   a light source for generating a light bundle;
   a pivotable deflection unit for deflecting the light bundle generated by the light source onto a projection surface; and an imaging device for imaging an aperture of the deflection unit onto the projection surface;
wherein the imaging device comprises a mirror objective having at least two mirror elements; and
wherein a distance between focal points of the first mirror element is less than 20 mm.

* * * * *